United States Patent [19]

Fortune

[11] Patent Number: 4,532,670
[45] Date of Patent: Aug. 6, 1985

[54] VACUUM BOOSTER AND FILTER

[76] Inventor: William S. Fortune, 29866 Cuthbert St., Malibu, Calif. 90265

[21] Appl. No.: 462,650

[22] Filed: Jan. 31, 1983

[51] Int. Cl.$^3$ .............................................. A47L 5/38
[52] U.S. Cl. ........................................ 15/314; 15/339; 417/392
[58] Field of Search .......................... 15/341, 314, 339; 60/412, 413; 138/31; 417/392, 395

[56] References Cited

U.S. PATENT DOCUMENTS

| 2,648,867 | 8/1953 | Erling | 15/314 X |
| 3,443,274 | 5/1969 | Rankin | 15/314 |
| 4,110,058 | 8/1978 | Langle et al. | 417/395 |
| 4,177,023 | 12/1979 | Kamiya et al. | 138/31 X |
| 4,350,477 | 9/1982 | Mazal | 417/384 |

FOREIGN PATENT DOCUMENTS 279373  3/1952  Switzerland .......................... 15/314

Primary Examiner—Chris K. Moore
Attorney, Agent, or Firm—Daniel T. Anderson

[57] ABSTRACT

A vacuum booster and filter, including a manifold having at least two nipples which connect, respectively, to a vacuum source and at least one vacuum utilization device. The latter may either be a vacuum-operated holding fixture or a vacuum-operated desoldering instrument. The booster itself includes a manifold with two or four nipples which may either extend laterally or upwardly. The booster also includes a hollow cylinder connected to the manifold by a narrower neck portion. A piston is disposed in the cylinder which is urged away from the manifold by a compression spring. Hence, when the vacuum pump is operating to pull out air from the vacuum utilization device, the air is partially stored in the vacuum booster and tends to urge the piston downwardly. The air that can be stored in the booster depends on the area of the booster multiplied by the spring force. The compressible filter of cylindrical form may be housed in the manifold and may consist of two parts, one of which acts as a spring. Alternatively, the filter may be toroidal in shape and spaced from the cover to provide a plenum to facilitate free air flow.

10 Claims, 9 Drawing Figures

Fig. 7.
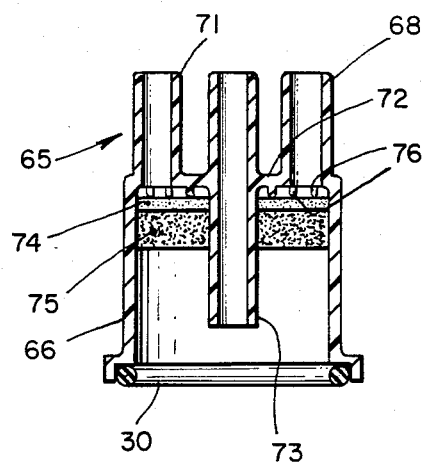
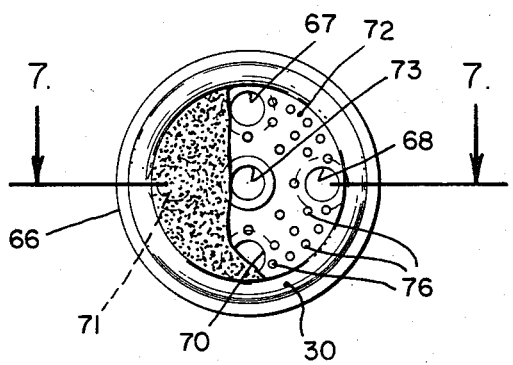
Fig. 8.

VACUUM BOOSTER AND FILTER

BACKGROUND OF THE INVENTION

This invention relates generally to vacuum systems such as used, for example, for desoldering instruments and particularly relates to vacuum boosters insertable into the system.

Generally, vacuum pumps which may be used for generating a vacuum for the purpose of desoldering circuit boards and the like do not generate a very strong vacuum. Such a vacuum pump is disclosed and claimed in FIGS. 1 and 2 of the applicant's prior Pat. No. 4,056,334. Therefore, it is desirable to provide provisions to extend or boost the vacuum available from the pump. Such a vacuum booster should be simple to construct and inexpensive to manufacture and should be readily insertable into a vacuum system to be boosted.

SUMMARY OF THE INVENTION

Hence, a vacuum booster in accordance with the present invention comprises a manifold having at least two nipples or outlets for connection, respectively, to a vacuum source and a vacuum utilization device. Such a device may, for example, consist of a vacuum desoldering instrument or of a vacuum-operated holding fixture. A hollow cylinder is connected to the manifold by a substantially air-tight connection, while a piston is slidably arranged in the cylinder and sealed thereto. A base is connected to the cylinder for supporting the booster and is disposed opposite the manifold. The base has a suitable opening extending therethrough and communicating with the atmosphere, to permit air to escape between the piston and the base. Finally, a compression spring is provided in the cylinder for urging the piston toward the base. Accordingly, a vacuum applied by the vacuum source tends to pull the piston against the spring force toward the manifold. On the other hand, when the utilization device is opened, it tends to store the air pulled out by the vacuum source in the cylinder against the spring force by a pressure proportional to the area of the piston multiplied by the spring force.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 3a is a side elevational view of FIG. 3 to illustrate the scale used to show when the filter must be cleaned or replaced;

FIG. 5 is a cross-sectional view of a check valve used in the system of FIG. 4, with a filter acting as a spring;

FIG. 7 is a vertical sectional view, taken on line 7—7 of FIG. 8, of a modification of a manifold which provides better filtering action; and FIG. 8 is a cross-sectional view taken on line 8—8 of FIG. 7.

DETAILED DESCRIPTION OF THE PREFERRED EMBODIMENTS

Figure 1:
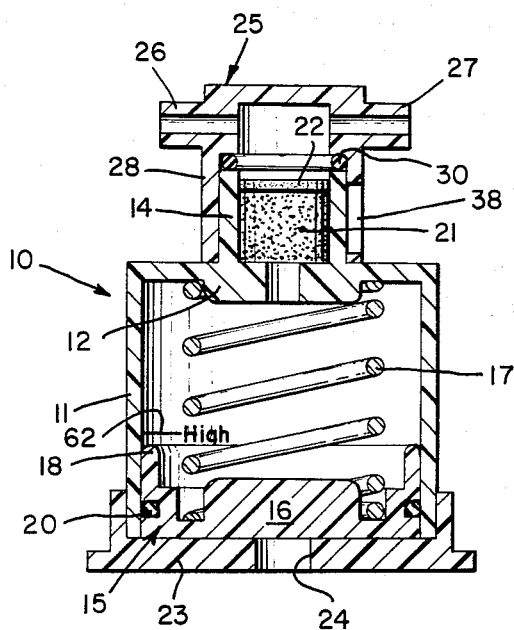
FIG. 1 is a cross-sectional view of the vacuum booster of the invention in its normal form; that is, without any force being applied.

Referring now particularly to FIG. 1, there is illustrated a vacuum booster and filter 10, embodying the present invention. The booster includes a cylindrical chamber 11 having a downwardly extending inner collar 12 and an upwardly extending neck portion 14. There is also provided a piston 15 having an upwardly extending boss 16 about which a compression spring 17 is mounted. The upper end of the compression spring encircles the collar 12.

The piston 15 has an upwardly extending skirt 18 and is sealed with respect to the wall of the circular chamber 11 by an O-ring 20 or other suitable seal.

Disposed within the neck 14 of the booster 10 is a coarse compressible filter 21 and a superimposed fine filter 22 for removing dirt and other impurities, such, for example, as solder, from the system. When solder or the like collects on the filter 22, the filter 21 is compressed by the weight of the solder, and because the air flow is retarded, that also tends to compress the filter. The booster also is provided with a base plate 23 having an exhaust port 24 for permitting the air between the piston 15 and the base plate 23 to escape.

The booster 10 also comprises a manifold 25 having at least two laterally extending ports or nipples 26 and 27. The nipples 26, 27 are in communication with manifold 25, forming a small cylindrical chamber. The manifold also has a downwardly extending skirt 28 which fits over the neck 14 and is sealed thereto by a suitable seal 30, such as an O-ring.

The nipple or port 26 may be connected to a vacuum pump or other vacuum source, while the nipple 27 is connected to a vacuum utilization device. The vacuum pump may, for example, be that of the above-referred to Pat. No. '334. The utilization device may, for example, be the desoldering instrument as described and claimed in the applicant's prior Pat. No. 3,980,218. Alternatively, the vacuum desoldering device of FIGS. 3 or 4 of the above-referred to Pat. No. '334 may be used. However, the vacuum utilization device may also consist of the clamping blocks or fixtures of FIGS. 6 through 9 of the applicant's prior Pat. No. '334. It will be understood that the holding fixtures and suction cup disclosed and claimed in applicant's prior Pat. No. 4,221,356, may be used as a holding fixture.

Figure 2:
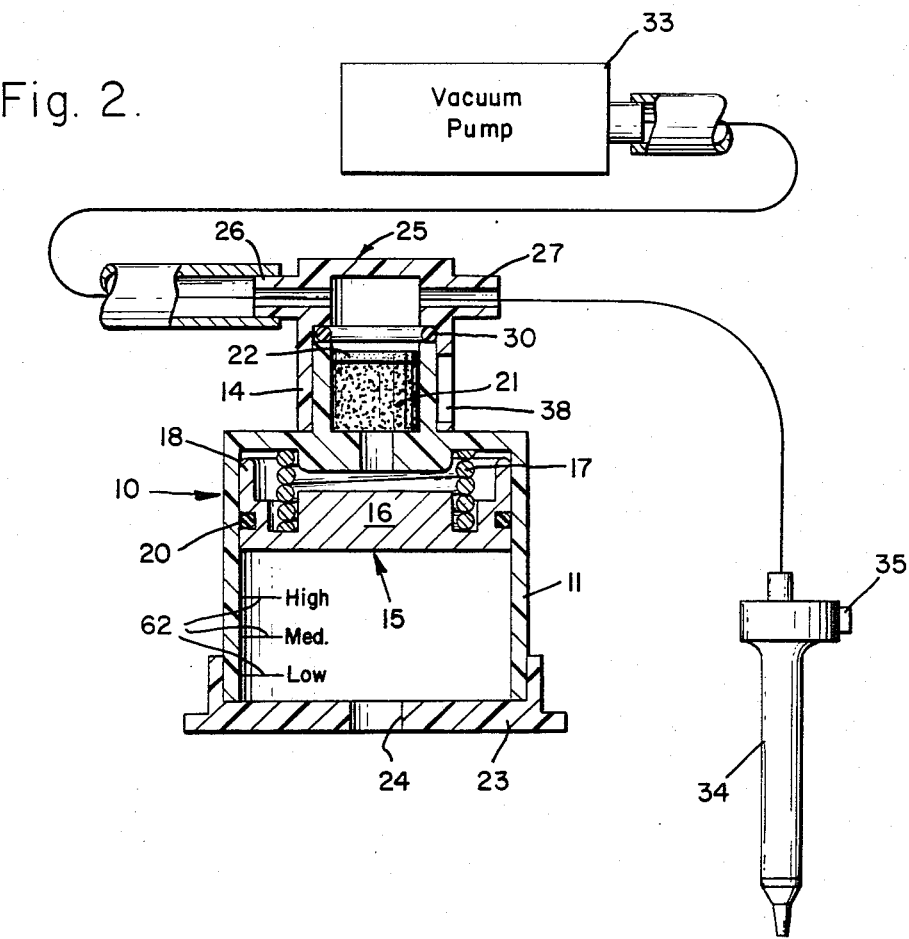
FIG. 2 is a cross-sectional view of the booster of FIG. 1 connected to a vacuum source and a desoldering tool, with a piston being sucked by the vacuum source toward the manifold.

FIG. 2, to which reference is now made, shows the vacuum booster and filter 10 of FIG. 1 connected to a vacuum pump 33 by the nipple 26, while the nipple 27 is connected to a vacuum-operated desoldering tool 34 having a vacuum release trigger 35. As explained in the above-referred to Pat. No. '218, when the vacuum release trigger 35 is depressed, the instrument is connected through the manifold 25 and the two nipples 26, 27 to the vacuum pump 33, thereby to suck up air and any liquid solder, for the purpose of desoldering and removing a component from a circuit board or the like.

Before the trigger 35 is depressed, the vacuum pump will evacuate the cylindrical chamber 11, thus forcing the piston 15 upward, as shown in FIG. 2, against the force of the compression spring 17.

Figure 3:
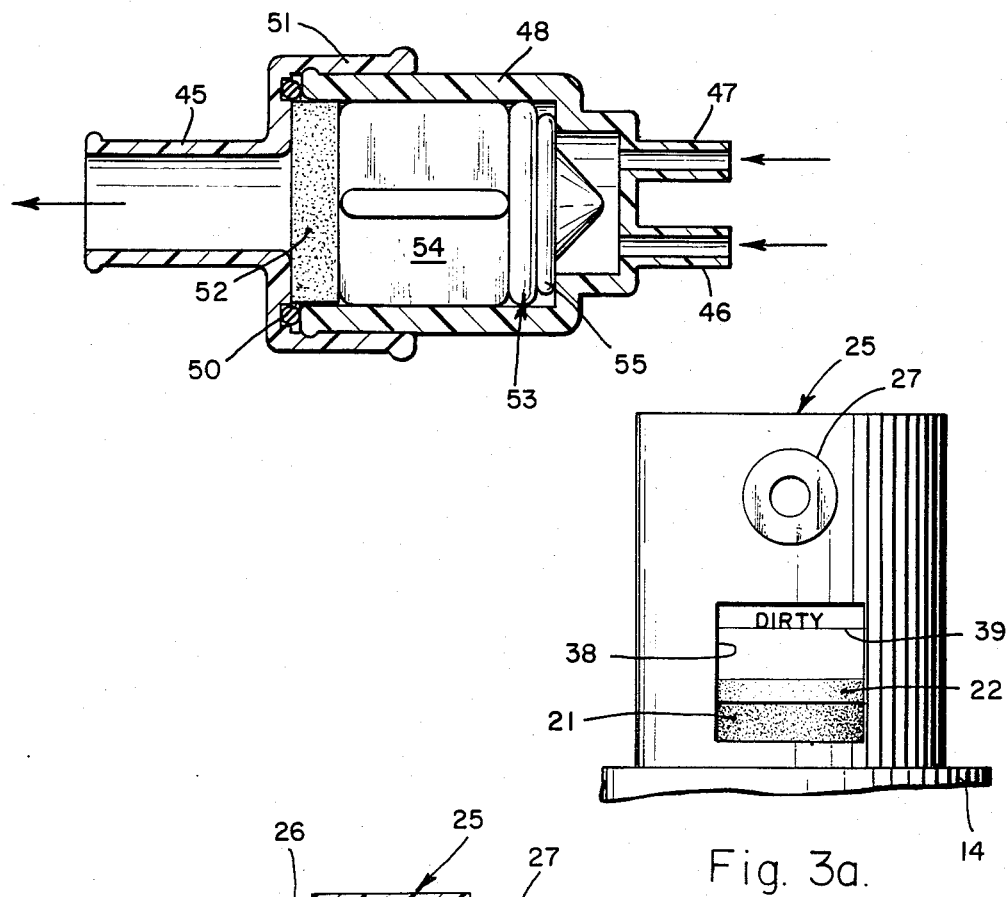
FIG. 3 is a cross-sectional view of the booster of the invention, similar to that of FIG. 1, but showing dirt or solder sucked into the booster with a compressible filter being partly compressed and only a partial vacuum provided in the booster.

Eventually, as the vacuum desoldering instrument is utilized many times, the solder or other debris collects in the space above the fine filter 22, as shown at 37 in FIG. 3. A suitable scale 39 (see FIG. 3A) may be disposed on the neck 14 to show that the filter 22 is dirty and must be cleaned or replaced. The coarse filter 21 is now compressed as previously explained. When the vacuum is released, there may be such an amount of debris or solder 37 that the air flow through the booster cylinder 11 is impeded and accordingly the piston 15 has only moved partially down toward the base 23. Another suitable scale 62 (labeled "low," "medium," and "high,") may be applied to the cylindrical chamber 11 to indicate the air pressure by the position of the piston 15. It will, of course, be assumed that in FIG. 3 the nipple 26 is connected to a vacuum source, while the nipple 27 is connected, for example, to a desoldering instrument 34.

The downwardly extending skirt 28 of the manifold 25 may be made of a non-transparent plastic. Since it is desirable to view the space within the neck 14 of the booster 10 and the scale 39, a window slot 38, as shown for example in FIGS. 1 and 3, may be provided in the skirt 28 of the manifold 25. This will permit to view the two filters 21, 22 and the scale 39 within the neck 14, which is made of a transparent plastic. This will also permit to view, by the scale 62, the degree of vacuum obtained within the booster 10, which may be observed by the position of the piston 15 and the amount of compression of the filter 21.

By way of example, both of the filters 21 and 22 may consist of styrofoam, except that filter 22 has smaller air holes or cells than the filter 21. Both filter 21 and 22 have open cells so that filter 21 is compressible. The manifold 25 may, for example, consist of polypropylene, while both the cylinder 11 and the base 23 may consist of polycarbonate.

When the amount of dirt is getting large, as shown in FIG. 3, the dirt may readily be removed by removing the manifold 25. The solder particles may then be removed by turning the booster 11 upside down. Eventually the filters 21, 22 may have to be replaced. As explained hereinbefore, the seal or O-ring 30 will again seal the manifold 25 to the booster 11 when the two are reassembled.

A simple analysis of the effect of the spring 17 and the piston 15 may readily be performed. This in turn will indicate the improvement in performance of the booster of the invention over a simple reservoir without the spring and the piston. As a result, the following formula is obtained:

$$\Delta V = \left(1 - \frac{P_0 - P_2}{P_0 - P_1}\right)(V_0 + V_3) + \left(1 - \frac{P_1}{P_2}\right) V_3 \quad (1)$$

In the above formula $\Delta V$ is the capacity or volume of the cylinder 11, which is the sum of the volume displaced by the stroke of the piston 15 and the added volume due to the compression of the gas in the clearance volume $V_3$.

$V_0$ is the volume defined by the area of the piston 16 multiplied by the free length of the spring 17.

$V_3$ is the volume of the cylinder 11 as defined by the fully compressed spring 17.

$P_0$ is the atmospheric pressure.

$P_1$ is the maximum vacuum pressure obtainable by the vacuum pump 33.

$P_2$ is the minimum vacuum pressure of the pump 33.

It may be seen from the above formula that there is a linear relationship between $\Delta V$ and $P$ and that the device of the invention has a superior storage capacity compared to that of a simple vacuum reservoir. The spring 17 should be as long as possible and preferably a constant force spring is to be used.

Frequently it will be desired to provide a booster system for several work stations. In that case, there may be one booster such as 10 for each work station. Such a system has been shown schematically in FIG. 4, to which reference is now made. There are illustrated four boosters 10-1, 10-2, 10-3, and 10-4, which are connected in series. Each booster now has four ports or nipples 26-1, 27-1 and 40-1, 41-1. Nipple 26-1 may again be connected to the vacuum pump 33 which connects to the four work stations by nipples 41-1, 26-2, 41-2, etc. Nipple 27-1 may be connected to a desoldering tool 34-1; the other desoldering tools being 34-2, 34-3, and 34-4.

The nipple 40-1 may be connected to a holding fixture such as a pair of vacuum vises 42-1, 43-1, of the type shown in the applicant's prior Pat. No. '334. Between the two vises a circuit board may be mounted for desoldering a certain component by the desoldering instrument, such as 34-1. Alternatively, the holding fixture disclosed and claimed in the Applicant's prior Pat. No. 4,221,356 may be used. A check valve 44-1, 44-2, etc., may be inserted between each of the nipples 40-1, 40-2, etc., and the vacuum vises 42-1, 43-1, and 42-2, 43-2. The last nipple 41-4 of the last booster 10-4 may be closed by a plug 40-5.

An example of such a check valve is shown in FIG. 5, to which reference is now made. Basically, the check valve of FIG. 5 resembles that shown at reference numerals 52 or 153, respectively in FIGS. 1 and 2 of the Pat. No. '334. The check valve of FIG. 5 has a cylindrical nipple 45 which in turn may connect to one of the nipples 40-1 and has the same outer diameter. It may have two outlet connections of smaller diameter 46 and 47 for connection respectively to the vacuum vises 42-1, etc. Alternatively, the two nipples 46, 47 and the base thereof may be cut off so that a larger hose may be inserted over the reduced end position of the housing 48.

A cylindrical housing 48 is provided which is sealed, for example, by an O-ring 50 to the nipple 45 and to cap 51. A filter 52 acts as a spring and is disposed in the housing 48 and bears against the shoulder of the nipple 45. Within the housing 48 there is disposed a butterfly shaped check valve 53 having butterfly wings 54. It is sealed, for example, by an O-ring 55 against the shoulder of the housing 48. When the vacuum sucks out air from the nipple 45 and the nipples 46 and 47, the check valve 53 moves toward the left of FIG. 5 to permit the air to be pumped out. Thereafter, the check valve will seal through the seal 55 and thus maintain the vacuum in the vacuum vises 42-1, etc., and 43-1, etc.

Figure 4:
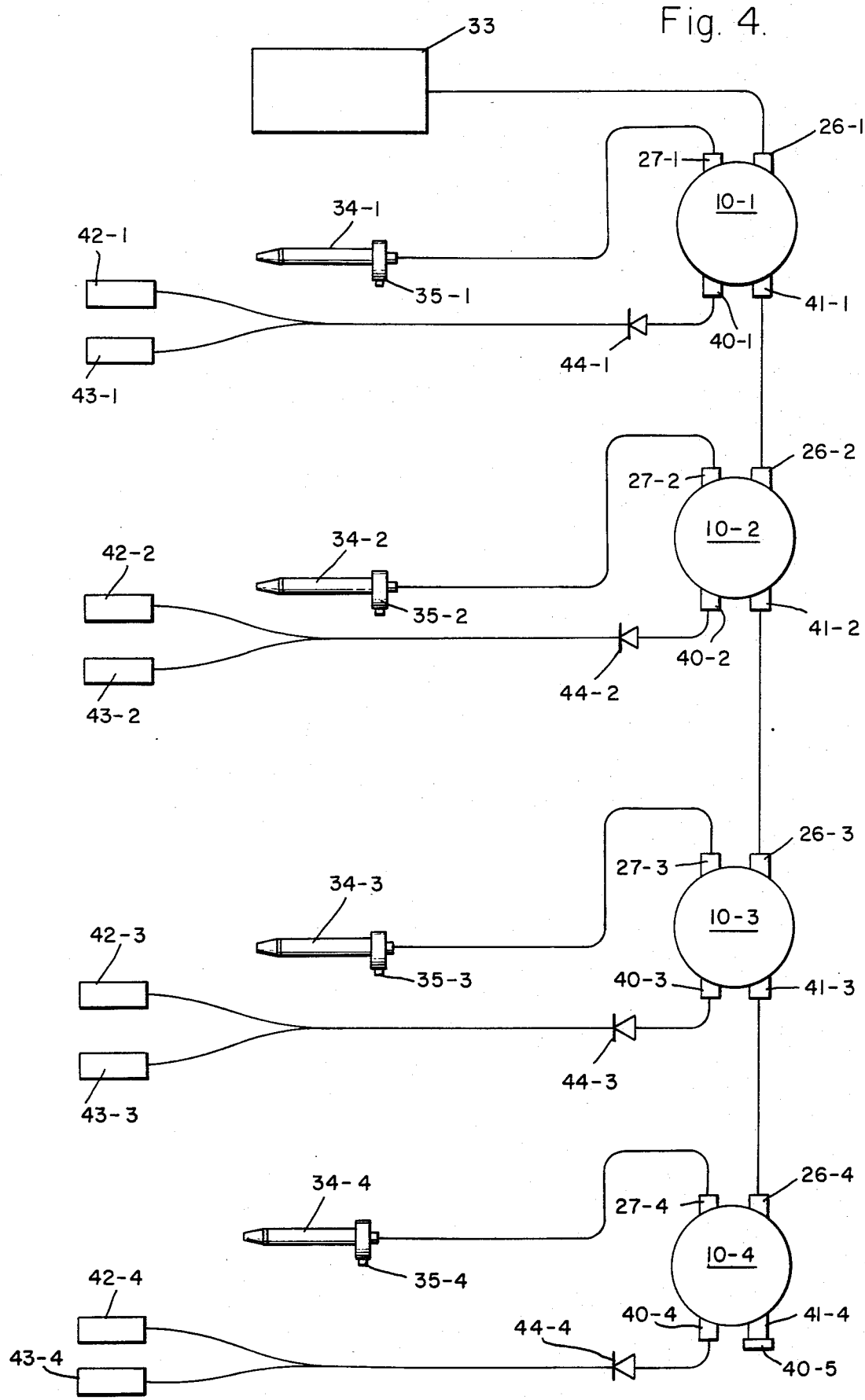
FIG. 4 is a schematic view of a plurality of boosters, all connected to a vacuum pump and on the other end each connected, respectively, to a desoldering tool and another vacuum utilization device, the boosters being connected in series.
Figure 6:
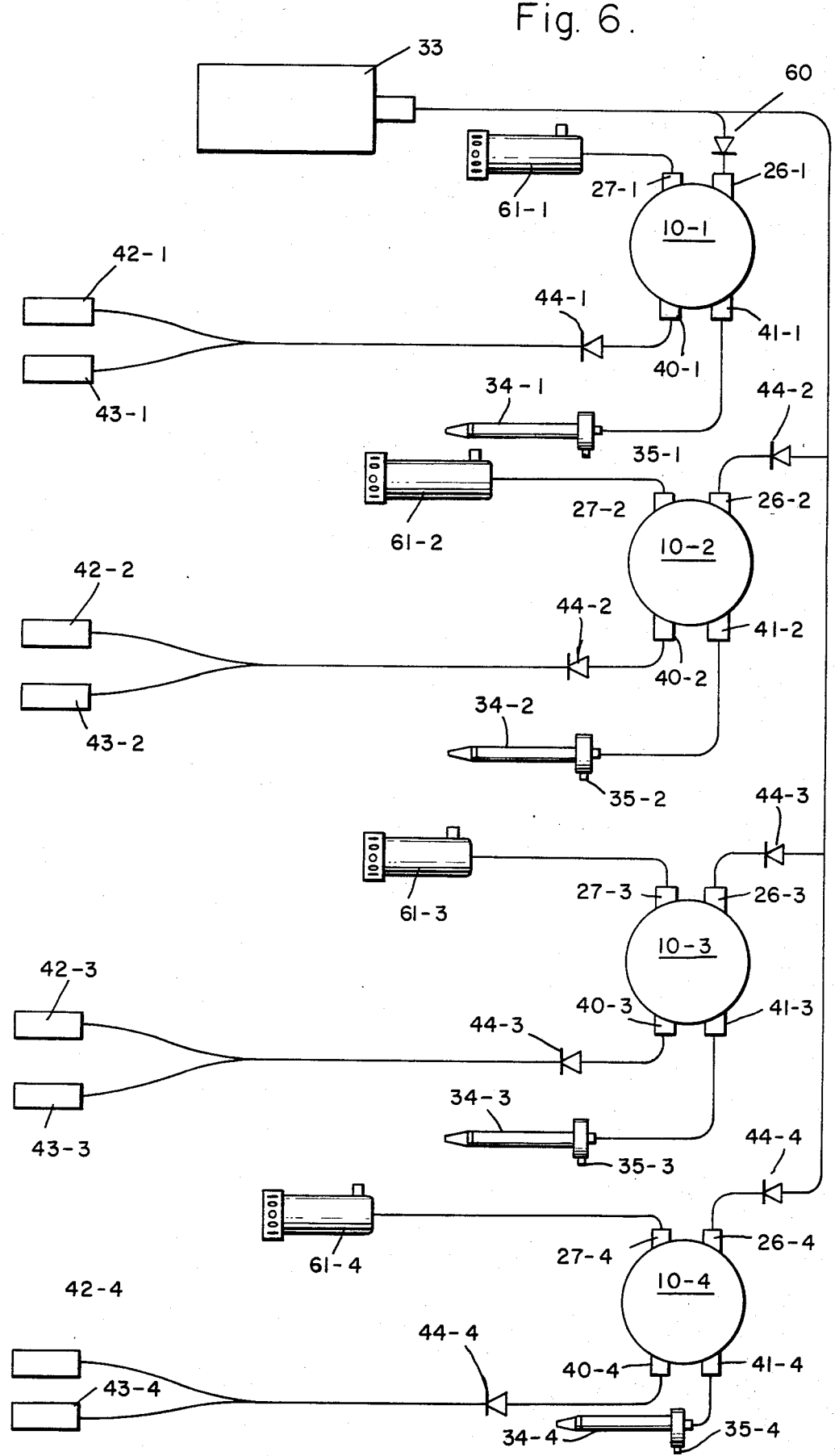
FIG. 6 is a schematic view similar to that of FIG. 4 but showing the boosters connected in parallel.

FIG. 6, to which reference is now made, illustrates schematically another system where the boosters are connected, not in series as in FIG. 4, but in parallel. Again, each of the boosters 10-1, 10-2, etc., has four nipples 26-1, 27-1 and 41-1, 42-1 etc. Nipple 26-1 is connected to the vacuum pump through a check valve 60 such as the one shown in FIG. 5 with only a single output nipple 46. Nipple 27-1 may be connected to a desoldering tool 61-1 which may have a multi-port soldering tip of the type shown in the applicant's prior Pat. No. 4,285,091, FIGS. 2 through 4. Such a desoldering tip will require a steady air flow for picking up liquid solder through the many apertures thereof.

The outlet 40-1 of the booster 10-1 may be connected to a pair of vacuum vises 42-1 and 43-1 through a check valve 44-1, similar to the system of FIG. 4. However, the outlet port 41-1 may be connected to a different desoldering tool, such as 34-1 in FIG. 4. The remaining boosters 10-2, etc., are connected in the same manner. In the system of FIG. 4, the last nipple 41-4 of the booster 10-4 has to be closed by a suitable plug or cap 40-5. In the system of FIG. 6, such a cap is not necessary because the nipple 41-4 is connected to the desoldering tool 34-4.

It will, of course, be understood that any number of boosters may be used instead of the four shown in FIGS. 4 and 6. In the system of FIG. 4, all of the boosters are connected in series. The advantage of that system is that when the trigger 35-1 of the desoldering tool 34-1 is closed, all of the boosters 10-1 through 10-4 are available to boost the evacuation of air through the desoldering tool 34-1. On the other hand, the disadvantage is that during that brief time, the people working on the other work stations 10-2 through 10-4 have no vacuum available.

In the system of FIG. 6, each of the boosters 10-1 through 10-4 is individually connected to the vacuum pump 33. Therefore, the people at the individual work stations each have power available and can work independently of each other. On the other hand, for each work station there is only a single booster, such as 10-1, available.

Referring now to FIGS. 7 and 8, there is illustrated an improved manifold generally designated 65. This manifold may be used to replace the manifold 25 of FIG. 1. As clearly shown in FIG. 7, it includes a hollow cylindrical portion 66 which may be sealed to the booster 10 by a suitable seal, such as an O-ring 30. Its dimensions are such that it fits about the neck 14 of the booster. Extending upwardly from the cylindrical portion 66 are a plurality of nipples 67, 68, 70, and 71. These nipples extend from a cover 72 of the manifold. There is provided a central tube 73 which extends into the space of the cylinder 66 and upwardly parallel to and has the same height as the nipples 67, etc. A fine filter 74 is disposed under the cover 72, below which extends a relatively coarse filter 75, the two filters being substantially the same as the filters 21 and 22 of FIG. 1. Again, the coarse filter 75 may act as a spring.

It will be evident from an inspection of FIG. 7 that the two filters 74 and 75 are toroidal in shape.

Preferably, a plurality of downwardly extending dimples or pads 76 is disposed on the lower side of the cover 72. They serve the purpose to prevent the fine filter 74 from sticking to the surface of the cover 72. Also, the pads 76 create a plenum above the filter 74 to provide free air flow.

As before, the central nipple 73 may be connected to the vacuum pump, while the outer nipples 67, 68, 70, 71, may be connected to respective vacuum utilization devices, as explained particularly in connection with FIGS. 4 and 6.

The advantage of a manifold of the type shown in FIGS. 7 and 8 is that it permits better filtering. In other words, any debris or solder which may be swept with the airstream from any one of the vacuum utilization devices will first be filtered by the filters 74 and 75 before it ever reaches the vacuum pump and the central nipple 73.

Furthermore, the cylindrical hollow portion 66 may also be made of a transparent material, as are the other parts of the booster of FIG. 1. As a result, there is no nead to provide window slots 38, 39, as shown, for example, in FIGS. 1 and 3.

There has thus been disclosed a vacuum booster and filter capable of effectively increasing the vacuum capability of a vacuum system. Each of the boosters is connectable to one or more vacuum utilization devices such as a desoldering instrument or a vacuum-operated holding fixture, depending on the number of nipples or output connections. The storage capacity of each booster is proportional to the area of the piston, multiplied by the force of the compression spring. Two filters are provided, the upper one of which is a fine filter for retaining solder particles or other debris, while the lower filter, which is coarser, operates as a spring. A window is provided to observe the status of the filters and the amount of collected debris, so that the booster can be cleaned easily and periodically. A plurality of boosters may be connected, either in parallel or in series, for a plurality of work stations. Each system has its particular advantages.

What is claimed is:

1. A vacuum booster comprising:
   (a) a manifold having two nipples for connection to a vacuum source and to a vacuum utilization device respectively;
   (b) a hollow cylinder having a substantially air-tight connection to said manifold;
   (c) a piston slidably arranged in said cylinder and being sealed with respect to the inner wall of said cylinder;
   (d) a base connected to said cylinder for supporting it and disposed opposite said manifold, said base having an opening communicating w1th the atmosphere to permit air between said piston and base to escape; and
   (e) a compression spring urging said piston toward said base, whereby a vacuum applied by the vacuum source tends to pull said piston against the force of said spring toward said manifold, while opening of the utilization device tends to store in said cylinder the air pulled out by the vacuum source in said cylinder at a pressure determined by the area of said piston and the force of said spring.

2. A booster as defined in claim 1 wherein a fine filter and a coarse compressible filter are disposed between said manifold and said cylinder for retaining dirt from the utilization device.

3. A vacuum booster and filter comprising:
   (a) a manifold having at least two nipples for connection respectively to a vacuum source and a vacuum utilization device;
   (b) a relatively large hollow cylinder having an upwardly extending relatively smaller cylindrical neck, said manifold having a skirt extending over said neck and having an air-tight connection therewith; said skirt being of an opaque material, said neck and cylinder being of a transparent material;

(c) a piston slidably arranged in said cylinder and including a seal for sealing it to said cylinder;

(d) a base connected to said cylinder for supporting it and disposed opposite said manifold, said base having an opening communicating with the atmosphere to permit air between said piston and said base to escape;

(e) filter means disposed in said skirt, and said skirt having a window to permit viewing of said filter means through said neck; and (f) a compression spring disposed in said cylinder urging said piston toward said base, whereby a vacuum applied by the source tends to move said piston against the force of said spring toward said manifold, while opening of the utilization device to the ambient air tends to store the air pulled out by the source from the device in said cylinder at a pressure determined by the area of said piston and the force of said spring.

4. A vacuum booster and filter as defined in claim 3 wherein a first seal is provided between said manifold and said neck and a second seal between said piston and said cylinder.

5. A vacuum booster and filter as defined in claim 3 wherein a scale is provided on said cylinder indicative of the vacuum in said booster.

6. A vacuum booster and filter as defined in claim 3 wherein a scale is provided on said neck to indicate the amount of debris collected in said filters.

7. A vacuum booster and filter system comprising:

(a) a plurality of vacuum boosters, each including a manifold having four nipples for connection to a vacuum source and at least one vacuum-operated desoldering instrument, each booster comprising:

(b) a relatively large hollow cylinder and a relatively small cylindrical neck of unitary construction, said manifold having a skirt extending over said neck;

(c) filter means disposed in said neck, said cylinder and neck being transparent and said skirt being opaque;

(d) a window disposed in said skirt to permit viewing of said filter means;

(e) a piston slidably arranged in said cylinder and being sealed with respect thereto;

(f) a base connected outwardly of said cylinder for supporting it and disposed opposite said manifold, said base having an opening communicating with the atmosphere to permit air between said piston and said base to escape; and (g) a compression spring urging said piston toward said base; said system further including:

(h) a vacuum source connected to all of said boosters through at least one of said nipples of each booster;

(i) at least two vacuum-operated utilization devices connected to at least two of the nipples of each of said boosters;

whereby a vacuum applied by the vacuum source tends to pull said piston against the force of said spring toward said manifold.

8. A booster system as defined in claim 7 wherein two of the nipples of each booster are connected in series and with the corresponding two nipples of the succeeding booster, the first nipple of the first booster being connected to the source, and means for closing the second nipple of the last booster; the third nipple of each booster being connected to a separate desoldering tool; a check valve for the fourth nipple of each booster, each of said check valves having two outlet connections, each being connected to one of a pair of vises.

9. A booster system as defined in claim 7 wherein a check valve is provided for each booster, said first one of said nipples of each of said boosters being individually connected through said check valve to the vacuum source, and wherein each of the remaining three of said nipples of each of said boosters is connected to a vacuum utilization device.

10. A booster system as defined in claim 9 wherein the three utilization devices connected to the remaining three of said nipples of each of said boosters are a first and a second, different, desoldering instrument and wherein the remaining utilization device is a pair of vacuum vises and a check valve with two outlets is connected between each of said pair of vacuum vises and one of said remaining nipples of each of said boosters.

* * * * *